8097X
D. Evans,
Band Pulley.
Patented Mar. 19, 1834.
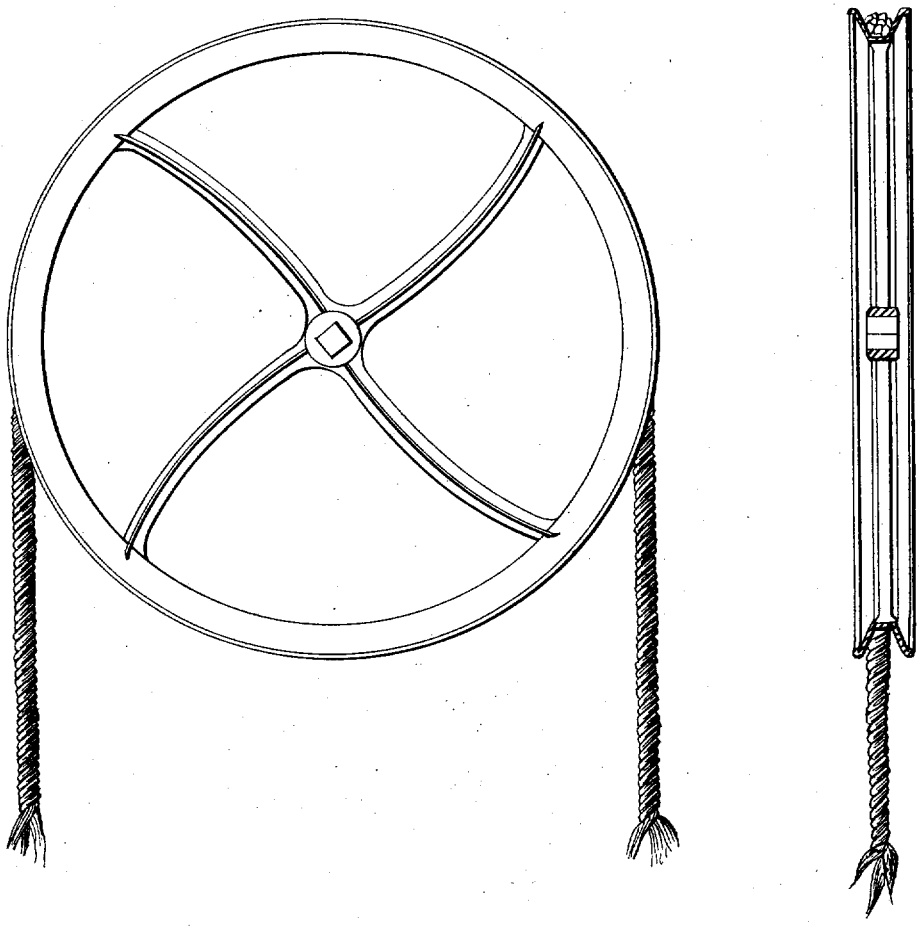
AM. PHOTO-LITHO. CO. N.Y. (OSBORNE'S PROCESS)

(March 19. 1834.) 213.

David Evans of Philadelphia Pennsylvania

Letters Patent

The schedule referred to in these Letters Patent and
making part of the same containing a description in
the words of the said David Evans himself, of his
improvement in "Machines for hoisting of goods, and
weights in Stores"

To all to whom these presents shall come
Be it known that I David Evans of the City of Phila
=delphia in the county of Philadelphia and State of
Pennsylvania have invented a new and useful impro
vement in "Hoisting Machines," And that the following
is a full and exact description of the construction and
operation of said Machine as invented or improved
by me, The Machine is in principle neither new
nor novel, but is one of the practical first principles
of the laws of Mechanics, a wheel with hub arms and
rim ~ The power is applied to the wheel around the
rim, and into the groove of which passes an endless
rope, the weight is drawn up by a rope winding round
the horizontal axle, the velocity of the power is to the
velocity of the weight as the circumference of the wheel is
to the circumference of the axle, I consider the improve
ment to consist in the form and materials of which this
wheel is constructed; principally the material it being of
iron, either wrought or cast: The wheels heretofore and now
being used were and are constructed of wood, the power
obtained by this iron wheel acting as a fly wheel is as
fifteen to one, A vertical wheel with a horizontal shaft
of indefinite size with hub arms and rim with a groove in the periphery of the wheel in which a rope is inserted the said wheel always to be constructed of Iron Witnesses
Edwd C. Watmough
Wm A. Sayer David Evans
Pat.

[369 W.B.

Drawing